United States Patent [19]

Bourla

[11] Patent Number: 5,244,251
[45] Date of Patent: Sep. 14, 1993

[54] PNEUMATIC SEAT FOR BICYCLE AND METHOD OF MANUFACTURE

[76] Inventor: Ilan Bourla, 6765 N. Corie La., West Hills, Calif. 91307

[21] Appl. No.: 686,004

[22] Filed: Apr. 12, 1991

Related U.S. Application Data

[63] Continuation-in-part of Ser. No. 461,269, Jan. 5, 1990, abandoned.

[51] Int. Cl.$^5$ ............................................. B62J 1/26
[52] U.S. Cl. ............................ 297/199; 297/200; 297/DIG. 2
[58] Field of Search ............... 297/195, 199, 200, 453, 297/DIG. 3, DIG. 2; 5/458

[56] References Cited

U.S. PATENT DOCUMENTS

| 574,503 | 1/1897 | Van Meter | 297/200 |
|---|---|---|---|
| 660,466 | 10/1900 | Sawtell | 5/458 |
| 674,451 | 5/1901 | Bunker | 297/DIG. 3 X |
| 1,975,405 | 10/1934 | Pryale | 297/195 |
| 2,558,389 | 6/1951 | Robinson | 297/200 |
| 4,433,708 | 2/1984 | Hashimoto et al. | 297/DIG. 3 X |
| 4,890,344 | 1/1990 | Walker | 297/DIG. 3 X |

FOREIGN PATENT DOCUMENTS

| 833296 | 3/1952 | Fed. Rep. of Germany | 297/195 |
|---|---|---|---|
| 3206314 | 9/1983 | Fed. Rep. of Germany | 297/195 |
| 1301506 | 7/1962 | France | 297/199 |
| 98346 | 3/1940 | Sweden | 297/200 |
| 656907 | 4/1979 | U.S.S.R. | 297/195 |

Primary Examiner—Peter R. Brown
Attorney, Agent, or Firm—Lewis Anten

[57] ABSTRACT

A air filled hollow seat has a relatively flexible top portion and a relatively rigid bottom support portion. The bottom support portion is integrally formed to the seat. An air inlet permits the injection of air, under pressure, into the interior of the hollow seat. The interior of the hollow seat has a plurality of partition members essentially separating the hollow interior of the seat into a plurality of individual chambers. The chambers are in air communication with one another.

9 Claims, 5 Drawing Sheets 5,244,251

PNEUMATIC SEAT FOR BICYCLE AND METHOD OF MANUFACTURE

This application is a continuation-in-part of application Ser. No. 07/461,269, filed Jan. 1, 1990, now abandoned.

BACKGROUND

Seat cushions, and particularly bicycle seats, are particularly uncomfortable during prolonged periods of use. The physical action of the legs in pedaling increases the discomfort.

In order to overcome the recognized discomfort associated with bicycle seats, a number of bicycle seats have been designed which are intended to conform to the buttocks of the user. Bicycle seats have been created which are molded to the contours of the user's buttocks. However, such seats are expensive, and require a great deal of time and expense to manufacture the seats on an individual basis. Further, even if such bicycle seats were perfectly adapted to the buttocks of the user, while the shape of the seat may stay constant, the shape of the buttocks may vary over time, and the desired shape may vary depending on the clothing that is worn.

Air filled bicycle seats have been attempted such as in the patent to Noyes et al., U.S. Pat. No. 4,611,851. While such a bicycle seat does permit conforming the shape of the seat to the buttocks, it does have a number of the substantial disadvantages. In the absence of the ability to control the interior structure of the seat, the distortion of the seat depends principally on the flexibility of the material used. If the material is too thin, then sitting on the seat would be comparable to sitting on a balloon, with air being forced out of one portion of the seat and forced into another portion of the seat, repeatedly varying the shape of the seat. If the material is too rigid, then the comfort of the seat and the inability of the seat to conform to the shape of the buttocks would be greatly reduced. Further, the use of the relatively rigid support plate allows the balance to be maintained.

Further, the manufacture of the bicycle seat of Noyes device requires numerous steps, which would increase the cost of manufacturing the seat.

SUMMARY OF THE INVENTION

In the present invention an air filled hollow seat has a series of internal ribs creating a plurality of separate chambers or compartments, each of which are in air connection with other of the compartments. The partitions serve to reduce substantial distortions within the hollow seat due to changes in pressure applied to the seat. They also serve to lend support to the buttocks of the user.

The bicycle seat has an internal relatively rigid support plate integrally formed during the injection molding process to the bottom portion of the hollow seat. The relatively rigid support plate has a plurality of openings, either in the form of slots, or holes, preferably extending throughout the support plate, so that during the molding process the rubber used in forming the seat flows into and is trapped by the openings in the relatively rigid support plate. This causes the support plate to be integral with the seat itself.

The seat has two downward extensions, one near the front and one near the back, extending from the rigid support plate. The two extensions serve to hold a curved rod that allows the seat to be attached to the seat bracket of a seat post.

An air control inlet of the conventional bicycle tire type that can be used with a typical air hose at a garage. An bleed valve or air outlet valve may be provided so that once the hollow seat is inflated and the user sits on the seat the user may easily release the air until the desired comfort is achieved.

The bottom portion of the hollow seat extends sufficiently beyond and below the relatively rigid support plate so that it provides a more comfortable feeling to the user. The portion also acts as a shock absorber to the legs and thighs of the user.

The distortion of the seat during use is not only makes the seat more comfortable, but also reduces friction on the legs of the user during pedaling.

OBJECTS OF THE INVENTION

It is an object of the present invention to provide a bicycle seat that is more comfortable;

It is another object of the present invention to provide a bicycle seat that is more adaptable to a variety of users;

It is still another object of the present invention to provide a bicycle seat that is easier to manufacture;

It is yet another object of the present invention to provide a bicycle seat that is more structurally sound;

It is still another object of the present invention to provide a bicycle seat that is able to withstand more pressure;

It is another object of the present invention to provide a bicycle seat that is easier to use.

These and other objects of the present invention will be apparent from a review of the following specification and accompanying drawings.

DESCRIPTION OF THE PREFERRED EMBODIMENTS

Figure 1:
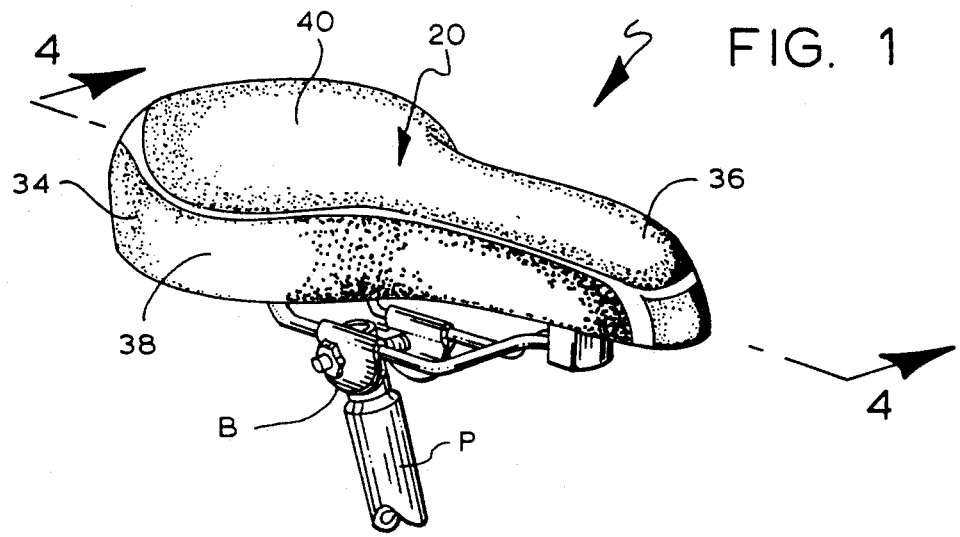
FIG. 1 shows a top perspective view of the pneumatic bicycle seat of the present invention.

The pneumatic bicycle seat 10 of the present invention has a rigid support base plate 12 generally encapsulated in plastic or similar material. Extending downward from the plastic encapsulated portion of the rigid support base plate 12 are two rod holders 14, 16, one near the front and the other near the back, respectively. A bent rod 18 is held in place by the holders 14, 16, the rod 18 allowing the seat 10 to be attached to a seat post P by brackets B.

A seat cover 20 is placed over and attached to the plastic encapsulated base plate 12 at its perimeter 22 and by means of central post extensions 24 descending into the encapsulated plate 12 from the bottom of the seat cover 20. Also descending from the bottom of the seat cover 20 are several lateral ribs 26 and one centrally located longitudinal rib 28.

To control the flow of air to and from the chamber 30 defined between the encapsulated base plate 12 and the seat cover 20, an air valve 32 is present descending from the encapsulated base plate 12 and tilted towards the rear of the bike seat 10.

FIG. 1 shows the current invention as assembled and ready for use. Outward appearances do not reveal the important internal structures present in the bike seat as a casual observer cannot see the internal structure of the bike seat of the current invention. Outwardly, the bike seat of the present invention could be confused with an average run-of-the-mill bike seat currently in production worldwide and well known in the art. However, the comfort delivered by the present bike seat is not available through such other bicycle seats.

Referring to the figures, the seat of the present invention is referred to generally by numeral 10. The seat has the conventional shape of a bicycle or motorcycle seat, having a wide rear panel portion 34, and a narrowed forward panel portion 36. The side panel 38 extends from top surface or top panel 40 to below the bottom surface or bottom panel 42. The top surface 40, the bottom surface 42 and the side panel 38 form an interior hollow chamber 30.

The entire seat 10 is attached to a bicycle frame by suitable connectors, such as by bolts which tighten a seat bracket B on a seat post P. such as by bolts.

The interior hollow chamber 30 has a plurality of partitions or ribs 26, 28 extending substantially perpendicularly and laterally from the interior seat cover surface 44. These ribs 26, 28 descend down the inside of the seat 10 and into the interior in a slightly parabolic manner. A central rib 28 extends the longitudinal length of the seat.

Figure 3:
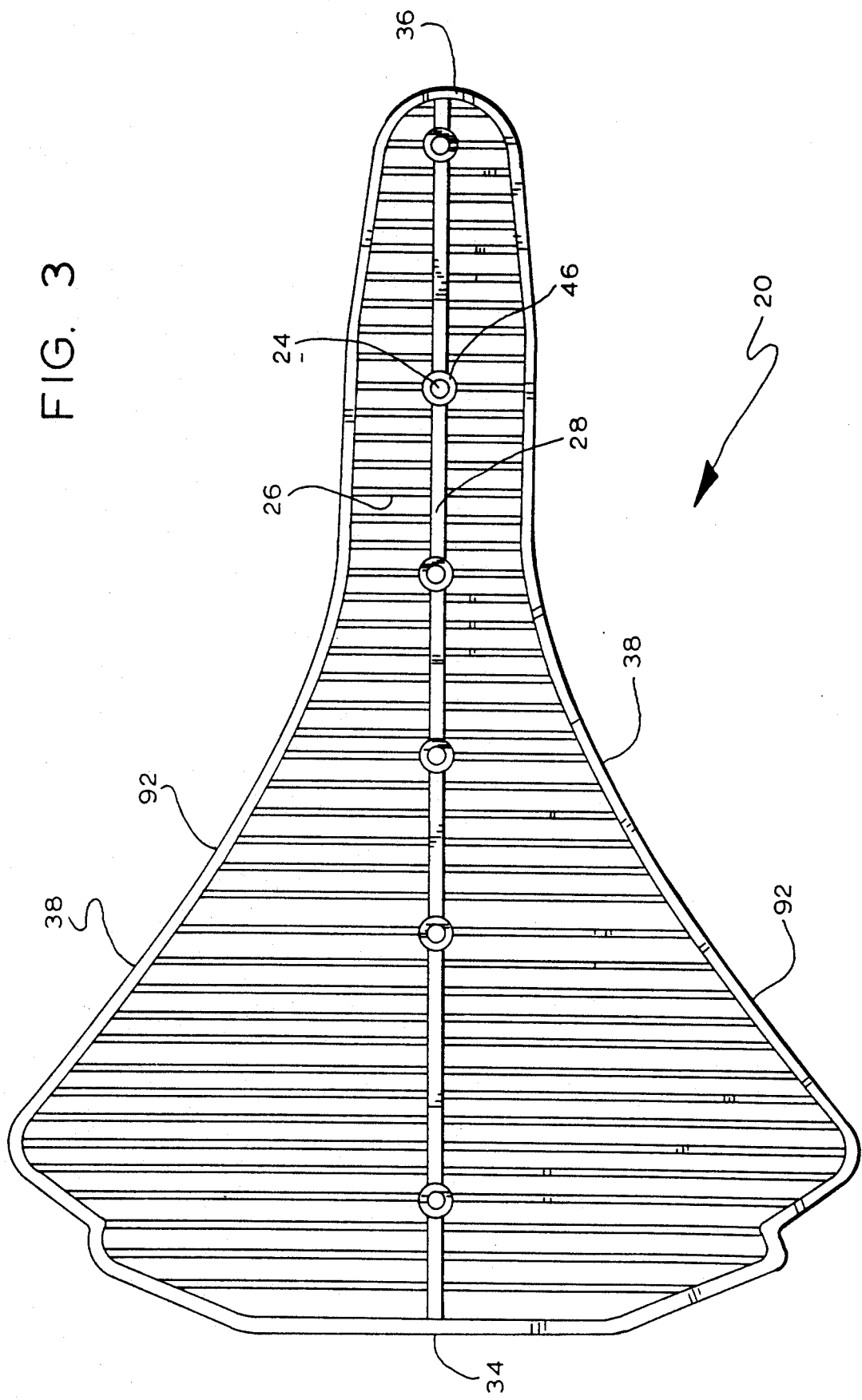
FIG. 3 shows a bottom plan view of the top cover portion of FIG. 1.

FIG. 3 shows the seat cover 20 as seen from the bottom looking into the seat cover. A series of forty-four lateral ribs 26 and one central rib 28 with six posts 46 having extensions 24 are present within the seat cover 20. All the ribs 26, 28 and the central posts 46 are attached to the interior of the seat cover 20 and are preferably formed integrally with it. The post extensions 24 are attached to the posts 46 and are formed integrally with them. The seat cover 20, ribs 26, 28, and posts 46 are made of resilient, flexible material. The panels of the seat cover 20 are approximately one-eighth inch thick.

The central rib 28 extends the length of the seat cover 20 at its center. The central rib 28 is approximately one-eighth inch wide and extends approximately one inch into the seat cover interior 30, about halfway into the seat cover interior. The central rib 28 is attached to the top panel 40 and both front 36 and rear 34 panels of the seat cover 20. The extension of the central rib 28 into the seat cover interior diminishes dramatically as it approaches the edge 48 of the seat cover.

Figure 6:
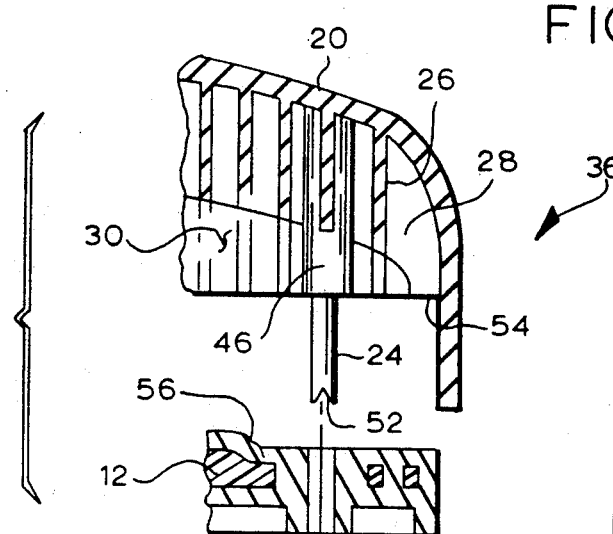
FIG. 6 shows an enlarged exploded view of FIG. 4 along encircled portion 6.
Figure 7:
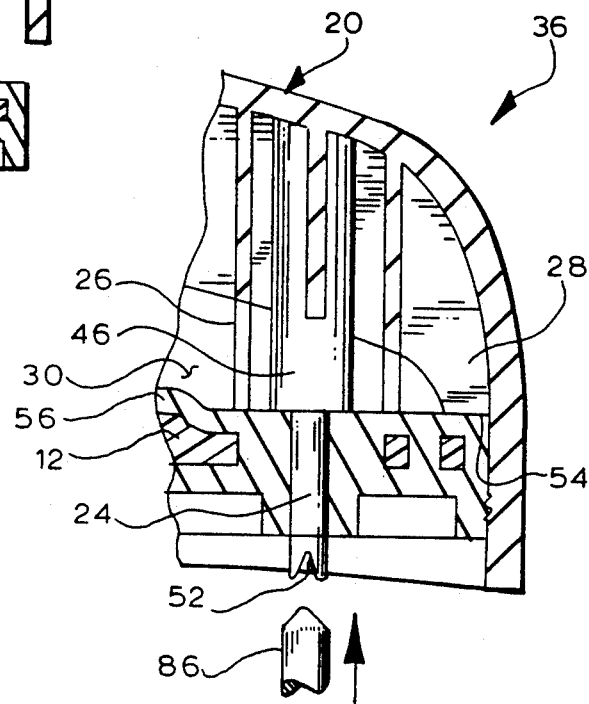
FIG. 7 shows the fitted pieces of FIG. 6 and an approaching bonding tool.
Figure 9:
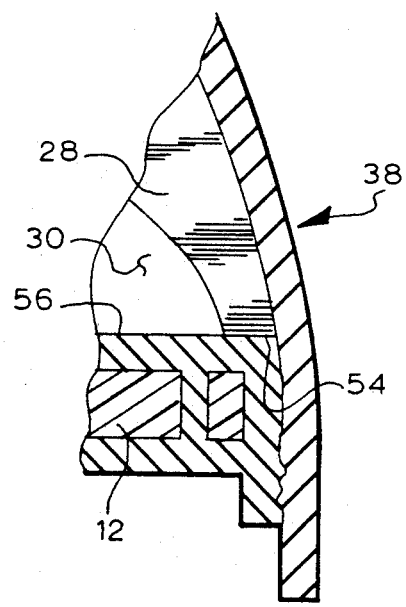
FIG. 9 shows an enlarged cross sectional view of FIG. 5 along encircled portion 9.

Sharing the central rib's attachment to the seat cover 20 are six posts 46. The posts 46 are approximately one-quarter inch wide and extend into the seat cover interior 30 a few or more inches. Extending from the free end of the posts 46 are post extensions 24 that are approximately one inch long and one-eighth inch wide. Upon fitting the seat cover 20 over the coated base plate 12, the posts 46 are flush with the top coated surface of the base plate 12 while the extensions 24 fit closely but comfortably in the edge-coated central holes 50 of the coated base plate 12. As shown in FIGS. 6 and 7, the post extensions 24 may have notches 52 at their ends to facilitate sealing. Like the central 28 and lateral 26 ribs, the posts 46 with their extensions 24 help provide support for the seat cover 20, distribute stress, and help the seat cover 20 retain its shape while in use.

The forty-four lateral ribs 26 are each approximately sixty thousandths of an inch wide, slightly thinner than the central rib 28. The lateral ribs 26 extend into the seat cover interior 30 to approximately the same extend as the central rib 28 and are attached to the seat cover 20 in a fashion and manner similar to that of the central rib 28. Like the central rib 28, the lateral ribs 26 have a flat portion 54 at their terminal ends that lays flush with the top coated surface 56 of the base plate 12.

Air may pass beneath both central 28 and lateral 26 ribs when the seat cover 20 is attached to the coated base plate 12. Both central 28 and lateral 26 ribs prevent the sides 24, 36, 38, of the seat cover 20 from ballooning out while in use. The ribs 26, 28 provide a retaining force upon the sides of the seat cover 34, 36, 38 when pressure is exerted on the seat 10, such as when someone sits on it.

The internal ribs 26, 28 and posts 46 serve to support the buttocks of the user and prevent the seat 10 from being so soft that it would easily deform in shape as the rider shifts weight on the seat 10, as occurs whenever riding a bicycle. This permits the use of more flexible materials for the seat 10 without having the undesirable results present in the prior art seats.

The series of ribs 26, 28 also serve to prevent the air within the interior 30 of the seat 10 from deforming the shape of the seat 10 that would occur if there were not any internal supports to restrict and control the movement of the seat cover. Otherwise, the effect would be comparable to sitting on a balloon, with pressure being applied in one portion of the seat 10, causing an almost instantaneous bulge in another place.

Figure 2:
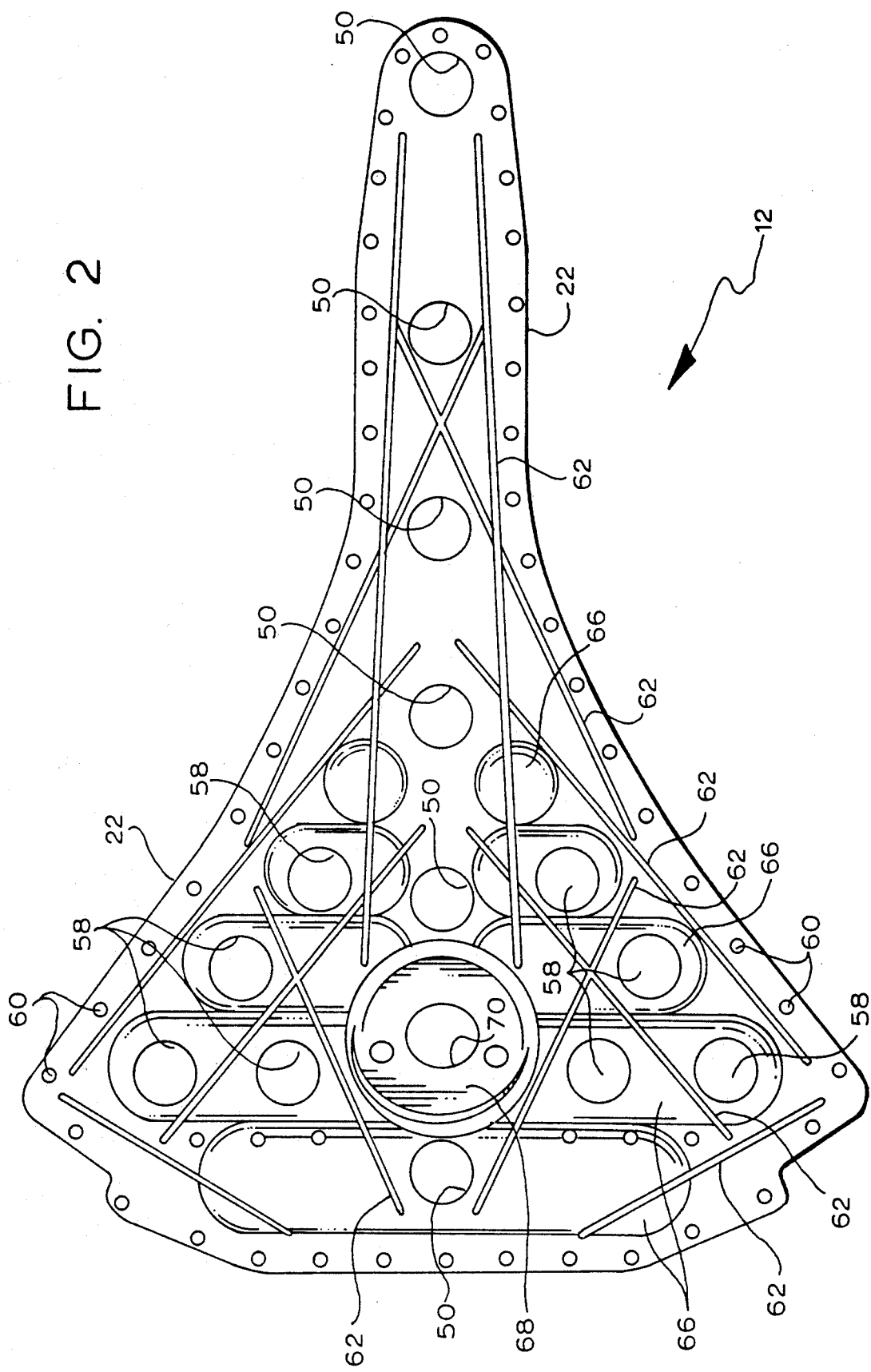
FIG. 2 shows a top plan view of the embedded plate.

Referring to FIG. 2, the support plate 12 is shown. The support plate 12 is made of a relatively inflexible light weight material, such as nylon or plastic, but may be made of steel or aluminum. The support plate 12 has a series of openings in the form of holes 50, 58, 60. The holes preferably pass through the entire plate 12, although they could be depressions in both sides of the plate 12 as well. FIG. 2 shows laid out the top side of the support base plate 12. When encapsulated in plastic, the support base plate 12 provides the sturdy foundation upon which the pneumatic bicycle seat 10 of the present invention relies.

Ridges 62 extend along the upper surface 64 of the base plate 12 to provide material support for it. These base plate ridges 62 are approximately one-quarter inch high and one-eighth inch wide. The length of the base plate ridges 62 are dependent upon the particular design of the base plate 12, but should be strategically placed for best results in reinforcing the base plate 12. The base plate ridges 62 are integral with the base plate 12.

Also integral with and providing reinforcement to the base plate are small bulges or bumps 66 of additional base plate material present at rear portions of the base plate 12. These bulges 66 run generally laterally across the base plate 12 while the base plate ridges 62 run generally longitudinally along the base plate 12. One bulge 66 is present between the two ridges of the narrowed portion of the base plate 12.

Centrally located in the rear portion of the base plate 12 is a tilted circular portion 68 of the base plate that provides an aperture 70 for the air valve 32. The aperture 70 is approximately one-half inch in diameter. As shown in FIG. 2, the tilted circular portion 68 faces slightly towards the front of the base plate 12. From the bottom of the base plate 12, the tilted portion 68 faces slightly towards the rear of the base plate 12.

Permeating the base plate 12 are a series of holes. Small holes 58 of approximately of one-eighth inch in diameter are present about the perimeter of the base plate 12. A series of larger holes 60 of about one-half inch in diameter are inside the perimeter of the base plate 12, towards the rear. Excluding the valve aperture 70, a series of large holes 50 runs longitudinally in the center of the base plate 12 from front to back.

Upon fabrication and setting of the base plate 12 with its holes 50, 58, 60, ridges 62, bulges 66, and downward extensions 14, 16, the base plate 12 is set into a die so that it may be coated or encapsulated in plastic. The die (not shown) generally conforms to the upper and lower portions of the base plate 12, but prevents the two rod holders 14, 16 and the central holes 50 from being coated in plastic. Plastic or other flexible material is the injected into the die to coat the appropriate areas of the base plate 12. The generally coated base plate 12 is then removed from the die.

During the coating process, the liquid plastic or other injected material, penetrates and fills the exposed small perimeter holes 58 and the larger, non-central holes 60 at the rear of the base plate 12. The coating also covers the ridges 62 on the top surface 56 of the base plate as well as the lower surface 72 of the base plate 112. A layer of coating approximately seventy-five thousandths of an inch surrounds the base plate 12.

Although the majority of the base plate 12 is coated, thereby encapsulating most of the base plate 12, portions of the base plate 12 are left uncoated, or only partially coated. Foremost are the downward extensions 14, 16 which are not coated. In order to accommodate the seat cover posts 46, the larger central holes 50 are only coated at their edges, the central portion of the central larger holes being clear of material. The clear area of the larger holes has an approximately one-eighth inch diameter. A series of holes 50 having coated edges and slightly smaller diameters is then produced along the central length of the base plate. The tilted air valve aperture 70 is also only edge-coated, retaining an open central aperture 70 for future air valve 32 placement.

In addition to the filled-in smaller perimeter 58 and larger off-center holes 60, as well as the edge-coated central holes 50 (including the air valve aperture 70), the encapsulation process leaves a skirt 74 of coating material descending from the perimeter 22 of the base plate 12. Skirts 76 of coating material of similar length and width descend from the edges of the central edge-coated holes 50, excluding the air valve aperture 70. These skirts 74, 76 provide means by which portions of the seat cover 20 may be bonded to the coated base plate 12, providing an airtight seal.

The central holes 50 provide means by which the base plate 12 may provide support to the bike seat 10 as well as providing means of airtight attachment for the seat cover 20 without excessively fatiguing the coating 78 of the base plate 12. The hoes 50, 58, 60 provide communication for the upper and lower coatings 80, 82 on the top and bottom surface of the base plate. The communication between the upper and lower coatings 80, 82 prevents the entire coating from experiencing much destructive fatigue as stress is better distributed by the coating layer 78. The air valve 32 is a conventional air valve commonly used on bicycle and automobile tires. The air valve 32 includes an air or bleed control for permitting the valve 32 to be connected to an air hose and pressurized air to be introduced into the hollow interior 30 of the seat 10. The air valve 32 does not let the air out when the air source is removed. A separate air outlet valve (not shown) may be used to make it easier to let the air out of the seat. The air valve 32 is inserted into its aperture 70 during the fabrication of the bicycle seat. This may occur either before or after the seat cover 20 is fitted and attached to the coated base plate.

In the preferred embodiment of the seat 10, air may be released so as to let air out by manipulation of the air valve 32, when the user is sitting on the seat 10, rather than when the user is not on the seat 10.

Figure 5:
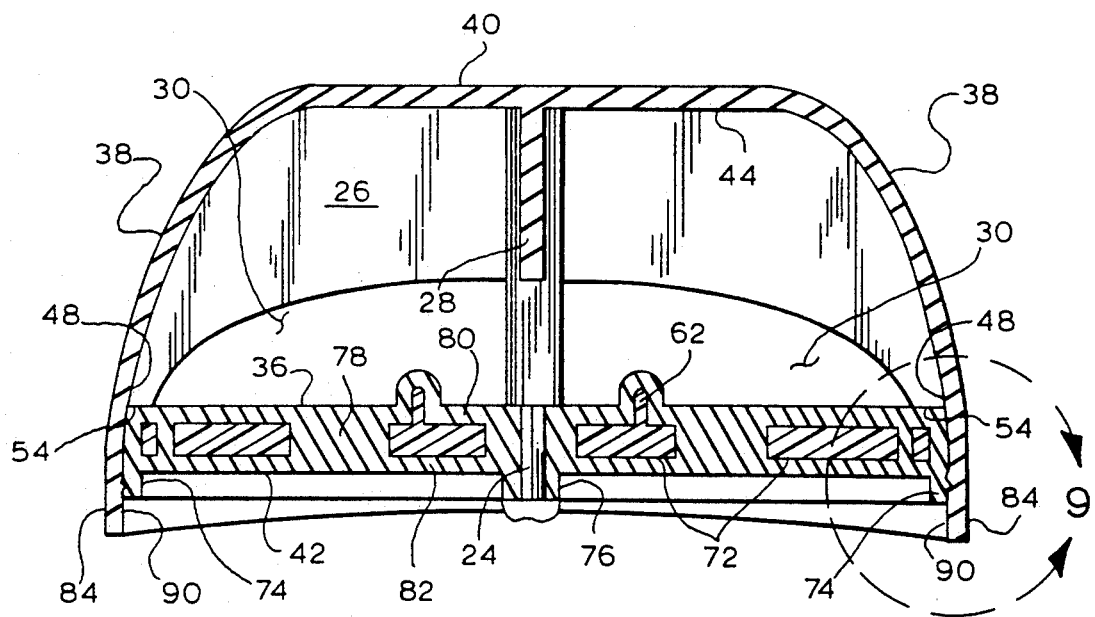
FIG. 5 shows a cross section view of FIG. 1 along line 5—5 of FIG. 4.
Figure 4:
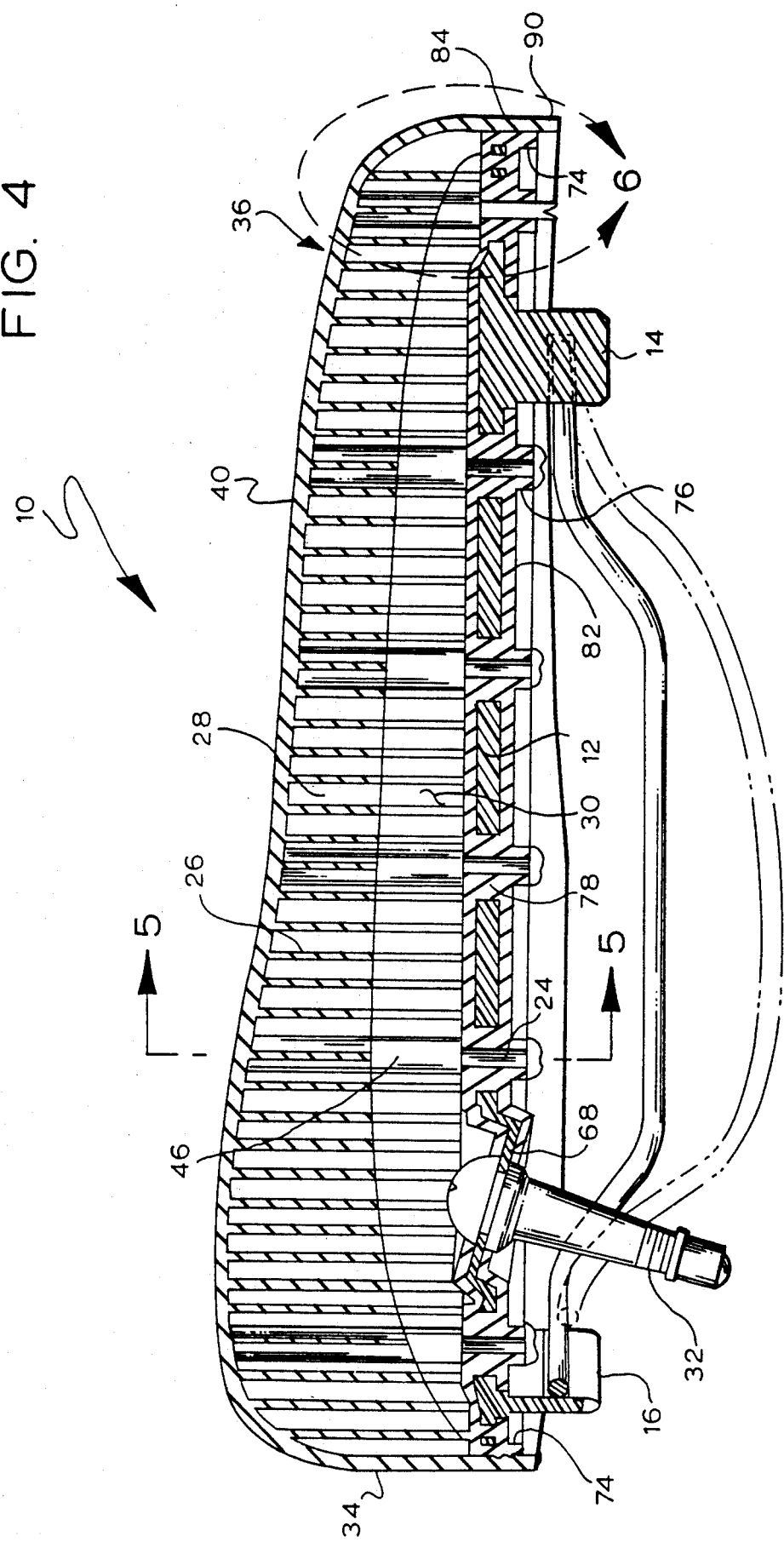
FIG. 4 shows a cross section view of the bike seat in FIG. 1 along line 4—4.

The support plate 12 is encapsulated within the hollow seat 10, surrounded by the bottom surface 10, as shown in FIG. 4. In the preferred embodiment the seat is made of rubber, plastic or other suitable flexible materials which is molded in the desired shapes and then assembled by ultrasonic welding or other conventional welding techniques. The support plate 12 has the rubber molded directly around it so that the support plate 12 is formed integrally with the bottom surface 72 of the seat as shown in FIGS. 4 and 5, so that the support plate 12 cannot separate from the seat 10.

Upon fabrication of the coated base plate 12 and the internally-ribbed seat cover 20, the two portions are fitted together, then bonded to each other. Any conventional means by which a strong, airtight seal may be provided is adequate for the present purposes.

Around the perimeter 22 of the coated base plate 12, the outer side of the base plate skirt 74 is bonded to the inner side of the seat cover skirt 84.

Figure 8:
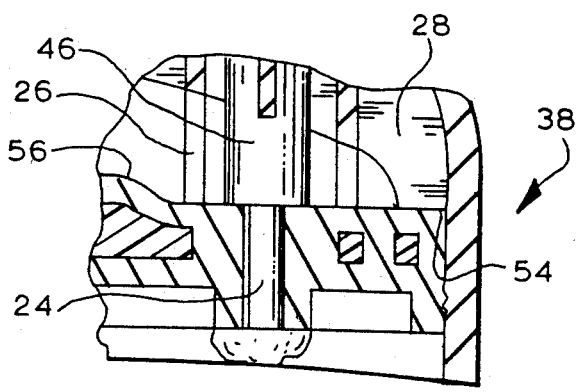
FIG. 8 shows the bonded upper and lower seat portions also shows in FIGS. 6 and 7 after bonding.

As shown in FIGS. 6-8, the post extensions 24 are fitted within its corresponding edge-coated central hole 50. Upon snug placement, a tool 86 (such as one with a hot tip) may be used to melt and fuse the post extension 24 with the skirt 76 of the edge-coated hole 50. This fusion provides physical attachment between the coated base plate 12 and the seat cover 20 as well as providing an airtight seal.

As shown in FIGS. 5-9, the side skirt 84 of the seat 10 has a portion 90 that the bottom surface 72 to add mass at a point that receives a lot of flexing during use, and to serve as an additional shock absorber.

This seat cover skirt 84 runs along the entire perimeter 92 of the seat cover 20. When the seat cover 20 is fitted upon the coated base plate 12, the seat cover skirt 84 is adjacent to and extends past the coated base plate skirt 74 approximately one-half inch. The two skirts provide means by which the coated base plate 12 and seat cover 20 may be attached at their perimeters 22, 92 to each other to provide an airtight seal. The seat cover skirt 84 extends past the base plate skirt 74 to provide an aesthetic appearance for the finished bike seat 10.

During use the bicycle rider will attach a conventional air hose that is available at most gas stations or by a standard bicycle pump to the input of the air valve 32 and inflate the seat 10 to an over inflated position. The user will then sit on the seat 10 and release the air by manipulation of the air valve 32 until the seat assumes the shape most comfortable to the user's buttocks. It is recognized that the shape most comfortable to an individual user is rather subjective. The user will learn from experience the desired degree of inflation.

It is recognized that while the preferred embodiment of the invention has been described, other variations of the present invention can be made without departing from the scope of the present inventions. For example, other materials may be used for the seat or other shapes of ribbing may be devised which provide the advantages described and obtained by the present invention. In addition, variations of means for connecting the seat to the bicycle frame or methods of construction may be employed. It is intended that such other variations also be considered within the scope and coverage of the present invention.

What I claim is:

1. An inflatable seat having top, bottom and side panels defining a hollow interior, each panel having an inside surface and an outside surface, comprising:
    a rigid support member at least partially encapsulated within said seat bottom panel, said rigid support member having a plurality of first openings therein;
    a plurality of depending support ribs attached to the inside surface of said seat top panel;
    a plurality of depending members attached to the inside surface of said seat top panel, extensions of said members extending to and attached to said seat bottom panel through at least one of said first openings on said rigid support member; and
    an air valve in communication with the interior of said inflatable seat extending through at least one of said panels for inflating said seat.

2. The inflatable seat of claim 1, further comprising a depending cylindrical attachment rod connected to said rigid support member, for attachment of said inflatable seat to the frame of a bicycle.

3. The inflatable seat of claim 1, wherein said rigid support member is substantially flat and further comprises:
    a circular opening in which said air valve is placed; and
    a plurality of second holes smaller than said first openings, said second holes being in said flat surface proximate the perimeter of said rigid support member.

4. The inflatable seat of claim 1 in which said rigid support member has a plurality of second openings proximate the perimeter of said rigid member perpendicular to the flat surface of said rigid support member.

5. The inflatable seat of claim 1, wherein said plurality of support ribs comprises:
    lateral ribs approximately sixty thousandths of an inch wide; and
    a central rib approximately one-eighth of an inch wide.

6. The inflatable seat of claim 5 wherein there are forty-four lateral ribs and one central rib.

7. The inflatable seat of claim 1, wherein said plurality of depending members comprises:
    posts approximately one-quarter inch wide having extensions approximately one-eighth inch wide.

8. An inflatable seat having top, bottom and side panels defining a hollow interior, each panel having an inside surface and an outside surface, and an air valve in connection with said hollow interior comprising:
    a rigid support member at least partially encapsulated within said seat bottom panel, said rigid support member having a plurality of first openings therein wherein said rigid support member is substantially flat and further includes a circular opening in which said air valve is placed and a plurality of second holes smaller than said first openings, said second holes being in said flat substantially rigid support member proximate the perimeter of said rigid support member;
    a plurality of depending support ribs attached to the inside surface of said seat top panel;
    a plurality of depending members attached to the inside surface of said seat top panel, extensions of said members extending to and attached to said seat bottom panel through at least one of said first openings on said rigid support member; and
    said air valve in communication with the interior of said inflatable seat through at least one of said panels for inflating said seat.

9. A rigid support base plate for an inflatable bicycle seat comprising:
    a substantially flat member having a top and a bottom surface;
    a plurality of raised strengthening ridges extending from at least a portion of said top surface;
    a plurality of strengthening bulges extending from said top surface; whereby
    said pluralities of ridges and bulges make said base plate structurally stronger without requiring the whole base plate to be made thicker, saving base plate material without sacrificing reliable and durable support by said base plate;
    said rigid support plate including a tilted circular portion defining an aperture in which an air valve is placed;
    a plurality of smaller holes along the perimeter of said rigid support member;
    a plurality of larger holes off-center and towards the rear of said rigid support member; and
    a plurality of larger holes centered on the longitudinal axis of said rigid support member.

* * * * *